(12) United States Patent
Xue et al.

(10) Patent No.: US 9,542,938 B2
(45) Date of Patent: Jan. 10, 2017

(54) SCENE RECOGNITION METHOD, DEVICE AND MOBILE TERMINAL BASED ON AMBIENT SOUND

(71) Applicant: ZTE CORPORATION, Shenzhen, Guangdong Province (CN)

(72) Inventors: Tao Xue, Shenzhen (CN); Junzhao Du, Shenzhen (CN); Hui Liu, Shenzhen (CN); Yuewei Liu, Shenzhen (CN); Wenjing Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/395,538

(22) PCT Filed: Apr. 18, 2013

(86) PCT No.: PCT/CN2013/074355
§ 371 (c)(1),
(2) Date: Oct. 20, 2014

(87) PCT Pub. No.: WO2013/177981
PCT Pub. Date: Dec. 5, 2013

(65) Prior Publication Data
US 2015/0120291 A1     Apr. 30, 2015

(30) Foreign Application Priority Data
May 28, 2012  (CN) .......................... 2012 1 0167980

(51) Int. Cl.
*G10L 15/20* (2006.01)
*G10L 15/16* (2006.01)
(Continued)

(52) U.S. Cl.
CPC ............... *G10L 15/20* (2013.01); *G10L 15/16* (2013.01); *G10L 25/51* (2013.01); *G10L 25/24* (2013.01)

(58) Field of Classification Search
CPC ...... G10L 21/0208; G10L 15/20; G10L 15/16; G10L 25/51
(Continued)

(56) References Cited

U.S. PATENT DOCUMENTS

| 6,006,175 A * | 12/1999 | Holzrichter | .......... A61B 5/0507 |
| | | | 704/205 |
| 8,812,310 B2 * | 8/2014 | Muhammad | ............ G10L 25/00 |
| | | | 704/205 |

(Continued)

FOREIGN PATENT DOCUMENTS

| CN | 1835073 A | 9/2006 |
| CN | 101980336 A | 2/2011 |

OTHER PUBLICATIONS

Chu et al. "Where Am I? Scene Recognition for Mobile Robots Using Audio Features." ICME. IEEE, 2006.*
(Continued)

*Primary Examiner* — Shaun Roberts
(74) *Attorney, Agent, or Firm* — Ling Wu; Stephen Yang; Ling and Yang Intellectual Property (57) ABSTRACT

The present document provides a scene recognition method and device based on ambient sound and a mobile terminal. The device includes: a sound collection module, a preprocessing module, a feature extraction module, a scene recognition module and a database. The method includes: collecting a sound signal; processing the sound signal into a frequency domain signal; extracting sound feature information from the frequency domain signal; inputting the sound feature information under a preset model, matching a model output result with weight values of sound sample models of scenes, and determining a scene corresponding to the sound feature information. The present document implements locating based on background sound information as the
(Continued)

feature of the scene, so that the mobile terminal quickly and correctly recognizes the current scene under the maintaining low-consumption state.

8 Claims, 4 Drawing Sheets

(51) Int. Cl.
*G10L 25/51* (2013.01)
*G10L 25/24* (2013.01)

(58) Field of Classification Search
USPC .................................................. 704/226, 233
See application file for complete search history.

(56) References Cited

U.S. PATENT DOCUMENTS

| | | | | |
|---|---|---|---|---|
| 2003/0040904 | A1* | 2/2003 | Whitman | G10L 17/02 704/212 |
| 2003/0061037 | A1 | 3/2003 | Droppo et al. | |
| 2004/0215454 | A1* | 10/2004 | Kobayashi | G10L 15/142 704/231 |
| 2005/0049855 | A1* | 3/2005 | Chong-White | G10L 19/173 704/219 |
| 2005/0228649 | A1* | 10/2005 | Harb | G10L 15/00 704/205 |
| 2009/0271188 | A1* | 10/2009 | Agapi | G10L 21/0208 704/233 |
| 2010/0185436 | A1* | 7/2010 | Saleh | G06F 17/27 704/9 |
| 2011/0106587 | A1* | 5/2011 | Lynch | G06Q 30/0204 705/7.33 |

OTHER PUBLICATIONS

Chu et al. "Environmental Sound Recognition with Time-Frequency Audio Features." IEEE vol. 17, No. 6. Aug. 2009.*
Recognition of Real-World Activities form Environmental Sound Cues to Create Life-Log; Dept. of Information and communication Engineering; The University of Tokyo, Tokyo, Japan, 2011.
Implementation of MFCC vector generation in calssification context; Journal Applied Computer Science; Dominik Niewiadomy, Adam Pelikant; Institute of Mechatronics and Information Systems, Technical University of Lodz, 2008.
Environmental Sound Recognition by Multilayered Neural Networks; Yoshiyuki To yoda et al. School of Computer Science and Engineering, Department of Information Systems, The University of Aizu, 2004.
Environmental Noise Classification for Context-Aware Applications; Ling Ma et al. School of Computing Sciences, University of East Anglia, Norwich, NR4 7TJ, UK, 2003.
SoundSense: Scalable Sound Sensing for People-Centric Applications on Mobile Phones; Hong Lu et al. Department of Computer Science Dartmouth College, 2009.

* cited by examiner

SCENE RECOGNITION METHOD, DEVICE AND MOBILE TERMINAL BASED ON AMBIENT SOUND

TECHNICAL FIELD

The present document relates to the technical field of intelligent terminals, and in particular, to a scene recognition method, device, and mobile terminal based on ambient sound.

BACKGROUND ART

Sound recognition technology is widely used in communication systems, for example, applying the sound recognition detection technology in a mobile communication system can improve the traffic processing capacity of the system. In addition, the sound recognition technology is increasingly used in a voice recognition filed, and the technology is already very mature, such as, IBM voice recognition input system ViaVoice, Microsoft voice recognition system SpeechSDK, etc.

With more and more smart phones are used in daily life, voice recognition is also well applied in the smart phones, e.g., iphone has issued a voice recognition application "Google Mobile App". Another improvement of that voice search is that accents can be selected, and Google can successfully recognize voices from different regions.

Due to the popularity of smart phones, a locating technology is also a hot spot for the application of the smart phone. At present, a scene recognition problem can be solved by making use of antenna-based locating technologies (e.g., WIFI, GSM and GPS) on which study has been widely made. With regard to outdoor locating, GPS has provided very ideal recognition accuracy. However, with regard to indoor locating, there is no ideal and thorough locating solution currently. With the restriction from factors such as internal topology and intense electromagnetic interference inside the building, the antenna signal strength often tends to vary irregularly, thereby making sensing devices unable to perform reasonable location speculation. It is found in study that WIFI signals fluctuate greatly during different periods over a day, and the variations of its strength are not even, and moreover we cannot ensure that the WIFI signals exist in all environments. On the other hand, signals of a base station are more stable at different time periods. However, since the deployment of base stations is not dense enough, there are a lot of difficulties in locating. In addition, such a locating method generally has a high requirement on perfection of infrastructure. However, such costs are undoubtedly high for developing regions. Locating based on GPS, GSM, WIFI signals cannot work in the indoor environment, or has larger locating error, and thus cannot distinguish indoor places geographically close to each other.

SUMMARY OF THE INVENTION

The technical problem to be solved by the present document is to provide a scene recognition method, device and mobile terminal based on ambient sound, to solve the problem that the mobile terminal cannot recognize the current scene.

In order to solve the above technical problem, the present document provides a scene recognition device based on ambient sound, comprising: a sound collection module, a preprocessing module, a feature extraction module, a scene recognition module, and a database; wherein, the sound collection module is configured to collect a sound signal and transmit the sound signal to the preprocessing module;

the preprocessing module is configured to process the sound signal into a frequency domain signal and transmit the frequency domain signal to the feature extraction module;

the feature extraction module is configured to extract sound feature information from the frequency domain signal;

the database is configured to store weight values of sound sample models of different scenes;

the scene recognition module is configured to input the sound feature information under a preset model, match a model output result with the weight values of the sound sample models of the different scenes, and determine a scene corresponding to the sound feature information.

The above device may further have the following characteristic:

the scenes refer to space scenes in different sound environments.

The above device may further have the following characteristic:

the sound collection module, the preprocessing module, the feature extraction module, the scene recognition module, and the database are all located in a mobile terminal.

The above device may further have the following characteristic:

the sound collection module, the preprocessing module, the feature extraction module, and the scene recognition module are all located in a mobile terminal, and the database is located in a service-side device.

The above device may further have the following characteristic:

the sound collection module, the preprocessing module, and the feature extraction module are all located in a mobile terminal, the scene recognition module and the database are located in a service-side device;

the mobile terminal further comprises a scene recognition control module, which is configured to receive the sound feature information and transmit the sound feature information to the service-side device, and is further configured to receive a recognition result output by the scene recognition module.

In order to solve the above technical problem, the present document further provides a mobile terminal, comprising: a sound collection module, a preprocessing module, a feature extraction module, a scene recognition module, and a database; wherein, the sound collection module is configured to collect a sound signal and transmit the sound signal to the preprocessing module;

the preprocessing module is configured to process the sound signal into a frequency domain signal and transmit the frequency domain signal to the feature extraction module;

the feature extraction module is configured to extract sound feature information from the frequency domain signal;

the database is configured to store weight values of sound sample models of different scenes;

the scene recognition module is configured to receive the sound feature information, input the sound feature information under a preset model, match a model output result with the weight values of the sound sample models of the different scenes, and determine a scene corresponding to the sound feature information.

In order to solve the above technical problem, the present document further provides a mobile terminal, comprising: a sound collection module, a preprocessing module, a feature extraction module, and a scene recognition module; wherein, the sound collection module is configured to collect a sound signal and transmit the sound signal to the preprocessing module;

the preprocessing module is configured to process the sound signal into a frequency domain signal and transmit the frequency domain signal to the feature extraction module;

the feature extraction module is configured to extract sound feature information from the frequency domain signal;

the scene recognition module is configured to receive the sound feature information, and is further configured to receive weight values of sound sample models of scenes from the service-side device, input the sound feature information under a preset model, match a model output result with the weight values of the sound sample models of the scenes, and determine a scene corresponding to the sound feature information.

In order to solve the above technical problem, the present document further provides a mobile terminal, comprising: a sound collection module, a preprocessing module, a feature extraction module, and a recognition control module; wherein, the sound collection module is configured to collect a sound signal and transmit the sound signal to the preprocessing module;

the preprocessing module is configured to process the sound signal into a frequency domain signal and transmit the frequency domain signal to the feature extraction module;

the feature extraction module is configured to extract sound feature information from the frequency domain signal;

the recognition control module is configured to receive the sound feature information and transmit the sound feature information to a service-side device, and receive a scene recognition result returned by the service-side device.

In order to solve the above technical problem, the present document further provides a scene recognition method based on ambient sound, comprising:

collecting a sound signal;

processing the sound signal into a frequency domain signal;

extracting sound feature information from the frequency domain signal;

inputting the sound feature information under a preset model, matching a model output result with weight values of sound sample models of scenes, and determining a scene corresponding to the sound feature information.

The above method may further have the following characteristic:

the scenes refer to space scenes in different sound environments.

The present document implements locating based on background sound information as the feature of the scene, so that the mobile terminal quickly and correctly recognizes the current scene under the maintaining low-consumption state. The scene locating of the present document can be complementary to the antenna position locating, to improve their accuracies and improve the performance of the mobile terminal.

PREFERRED EMBODIMENTS OF THE INVENTION

Figure 1:
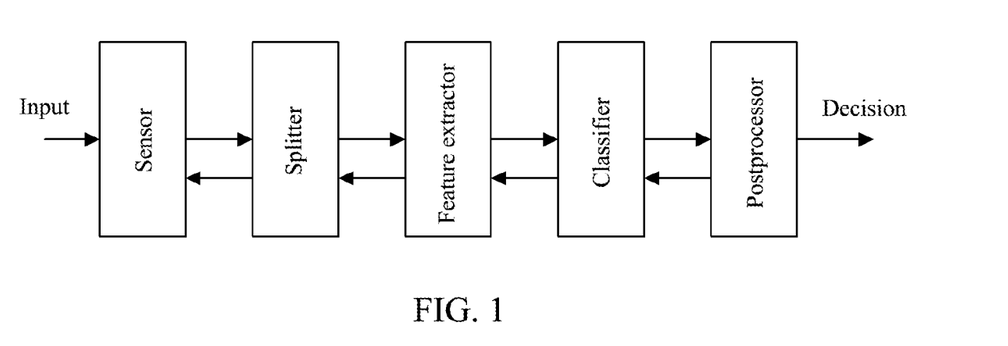
FIG. 1 illustrates a flow diagram of a sound recognition processing in the related art.

FIG. 1 illustrates a flow diagram of a sound recognition processing in the related art, in which the sound is recognized through a classifier after splitting the sound and extracting features.

A scene recognition method based on ambient sound comprises: collecting a sound signal; processing the sound signal into a frequency domain signal; extracting sound feature information from the frequency domain signal; inputting the sound feature information under a preset model, matching a model output result with weight values of sound sample models of scenes, and determining a scene corresponding to the sound feature information.

The scenes refer to space scenes in different sound environments, for example, the scenes refer to one of the following scenes: dining hall, classroom, laboratory, dorm, corridor, badminton court, table tennis court, elevator, meeting room, playground and street.

Figure 2:
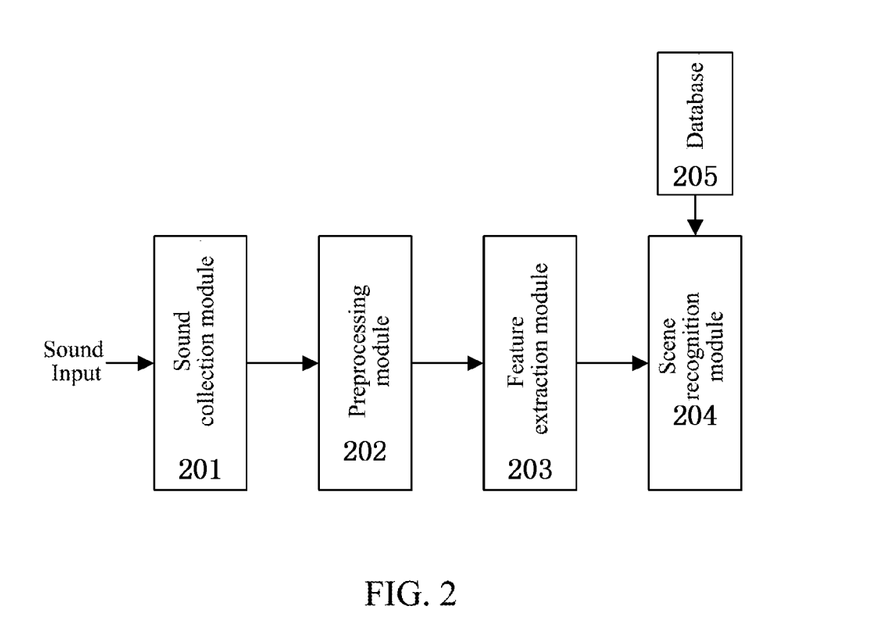
FIG. 2 illustrates a structure diagram of a scene recognition device based on ambient sound in an embodiment.

As shown in FIG. 2, a scene recognition device based on ambient sound comprises: a sound collection module (201), a preprocessing module (202), a feature extraction module (203), a scene recognition module (204), and a database (205).

The sound collection module (201) is configured to collect a sound signal and transmit the sound signal to the preprocessing module (202);

the preprocessing module (202) is configured to process the sound signal into a frequency domain signal and transmit the frequency domain signal to the feature extraction module (203);

the feature extraction module (203) is configured to extract sound feature information from the frequency domain signal;

the database (205) is configured to store weight values of sound sample models of different scenes; and the scene recognition module (204) is configured to input the sound feature information under a preset model, match a model output result with the weight values of the sound sample models of the different scenes, and determine a scene corresponding to the sound feature information.

The preprocessing module (202) samples the collected sound signals, with the sampling frequency being 8000 Hz and the length of the collected sample being 15 s, and then performs framing operation on this segment of sound sample, wherein each frame comprises 256 sampling points, i.e., each frame has a length of 32 ms. In this way, the initial audio becomes 468 frames having a length of 32 ms. The purpose of framing operation is that: some big or small burst sounds are randomly present in any segment of sound sample, the burst sound has no regulation and is not the sound to be able to represent the characteristic of the scene, and the burst sound causes the sound waveform to present bigger burrs, thereby affecting the accuracy of sound recognition; but, the shorter the time of the audio is, the more stable the audio waveform is. However, if the length of a frame is too short, it will cause the increase of operation costs, i.e., increase of calculation energy consumption and time consumption. This scheme adopts 32 ms as the length of each frame, which achieves the balance between accuracy and calculation costs.

The sound feature extracted by the feature extraction module (203) can be Mel-frequency cepstrum coefficient (MFCC), for example, 13-dimensional MFCC coefficient. For example, 468 groups of 13-dimensional feature vectors can be extracted from each segment of 15 s sound sample. After calculating the feature vector of each frame, an arithmetic mean must be taken for these 468 groups of feature vectors. The above dividing each segment of sound sample into frames with the length of 32 ms is for removing the burrs in the sound sample, but only framing each segment of audio cannot clear away the burrs. Therefore, in this scheme, after extracting the feature vector from each frame of audio, the arithmetic mean must be taken for these 468 groups of feature vectors to obtain a unique group of 13-dimensional feature vector. Such a group of feature vectors reduces the influence of burrs in the sample, and correctly represents the characteristic of this segment of scene.

A preset model in the present scheme may be a classification model such as neural network, etc.

The present scheme uses an algorithm in the mode classification field. This algorithm is divided into two parts, a training part and a recognition part. In the training part, this algorithm uses a training set of a certain scale, and generates several so-called intermediate matrix data sets. In the recognition part, calculation is made using these matrixes and feature vectors extracted from the sound sample to obtain a final result, i.e., recognition result. In the developing process, the training part of this algorithm does not need to be written into the mobile phone system, and the calculation is not needed for each time of recognition, which can greatly reduce the calculation time. The training set used in the recognition algorithm is collected from each scene needed to be recognized, 160 to 200 segments of sound samples need to be collected from each scene, and the feature vector is extracted from each segment of sound sample. The feature vectors from these sound samples, as parameters, are collectively delivered to the training part of the algorithm to finally obtain the intermediate matrixes. These intermediate matrixes are stored in the database and are used for invoking by the recognition part of the algorithm. Since the accuracy of scene recognition needs to be improved constantly, and meanwhile the scenes to be recognized need to be updated constantly, the intermediate matrixes required in the classification recognition algorithm in the present scheme also need to be updated constantly. With the update of the scenes, this technology will have the more powerful timeliness and availability.

Figure 3:
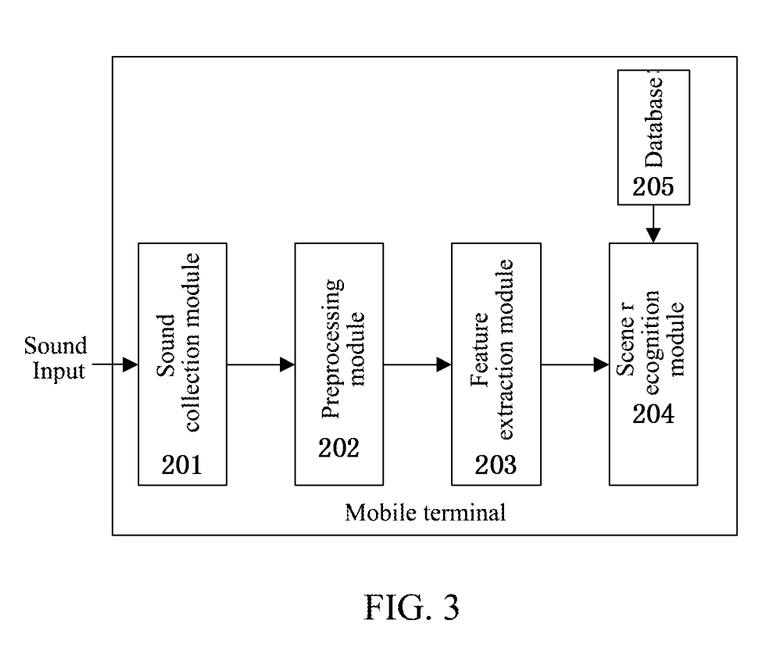
FIG. 3 illustrates a structure diagram of a scene recognition device according to an embodiment One.

As shown in FIG. 3, in the embodiment One, the sound collection module (201), the preprocessing module (202), the feature extraction module (203), the scene recognition module (204), and the database (205) are all located in a mobile terminal.

Figure 4:
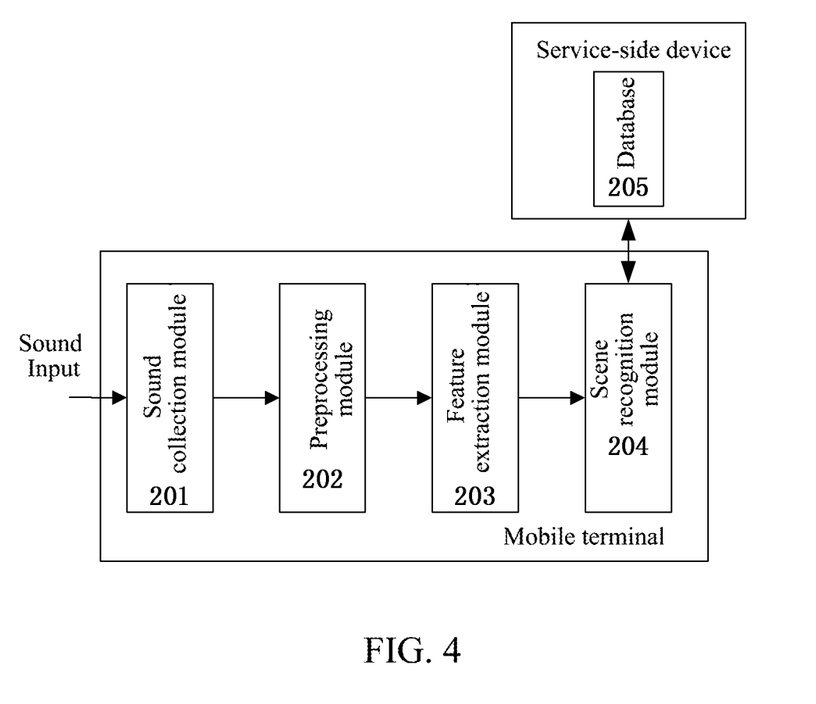
FIG. 4 illustrates a structure diagram of a scene recognition device according to an embodiment Two.

As shown in FIG. 4, in the embodiment Two, the sound collection module (201), the preprocessing module (202), the feature extraction module (203), and the scene recognition module (204) are all located in a mobile terminal, and the database (205) is located in a service-side device.

Figure 5:
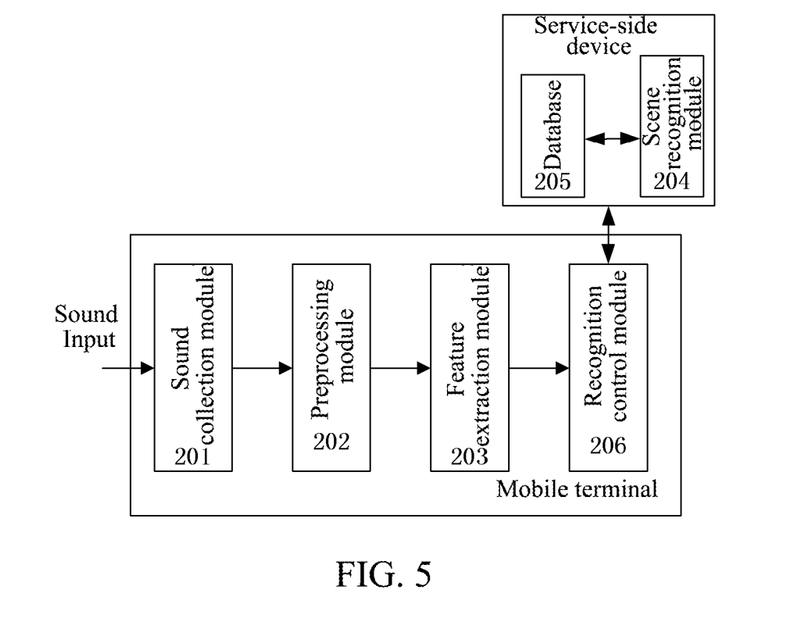
FIG. 5 illustrates a structure diagram of a scene recognition device according to an embodiment Three.

As shown in FIG. 5, in the embodiment Three, the sound collection module (201), the preprocessing module (202), and the feature extraction module (203) are all located in a mobile terminal, the scene recognition module (204) and the database (205) are located in a service-side device. The mobile terminal further comprises a scene recognition control module (206), which is configured to receive the sound feature information and transmit the sound feature information to the service-side device, and is further configured to receive a recognition result output by the scene recognition module (204).

Description will be made in detail below with reference to specific examples.

The present document is developed based on the Android system. A smart phone is selected as a test device. The recognition process comprises the following steps:

Step 1, Sound Collection Process

The microphone in the smart phone is responsible for collecting sounds, wherein the sampling rate is 8000 Hz and the sampling code is 16 bit, and the length of each segment of sound sample is 15 s.

Step 2, Scene Recognition Process

During the preprocessing, the framing process is performed to the audio, and the signal is converted from the time domain signal to the frequency domain signal. It is found in the experiment that when the frame length is 256, i.e., the time length is 32 ms, the highest recognition accuracy rate can be obtained. Meanwhile, there are several defective points at the beginning of each segment of audio. Therefore, deleting some sampling points at the very beginning of each segment of audio can ensure that the remaining audio sampling points all can show the characteristic of this audio segment. In order to save more hardware space, once one frame is separated out, this frame, as a parameter, is delivered to the feature extraction function for calculation. In this way, it only needs to store the feature vectors extracted from each frame, without the waste of control for storing the audio of each frame.

The step of extracting the feature comprises the following steps.

In step 2.1, a fast Fourier transform is executed to convert the time domain signal into the frequency domain signal.

$$X_a(k) = \sum_{n=0}^{N-1} x(n)e^{-\frac{j2\pi}{N}}, 0 \leq k \leq N$$

In this formula, x(n) is an input audio signal, and N is the point number of the Fourier transform.

In step 2.2, the arithmetic square is calculated for the spectrum amplitude of the signal, then the power spectrum can be obtained.

Figure 6:
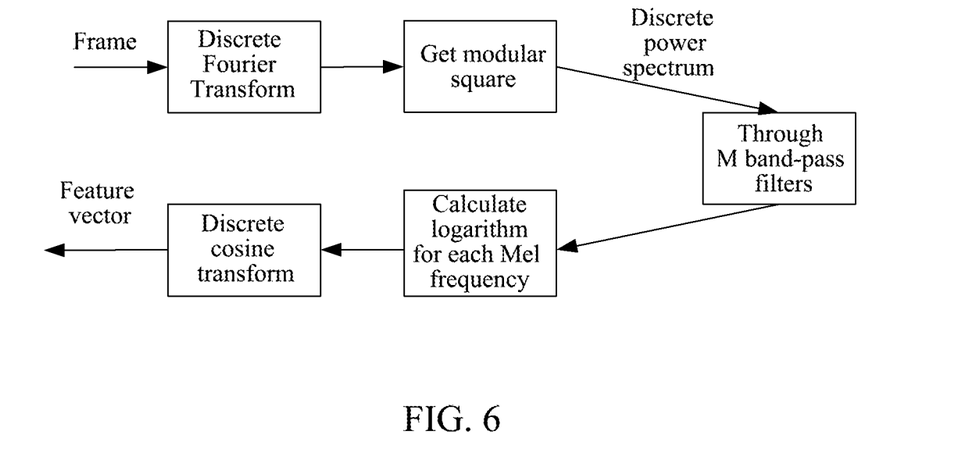
FIG. 6 illustrates a schematic diagram of a process of extracting a feature vector according to an embodiment.

In step 2.3, as shown in FIG. 6, the power spectrum of the signal is filtered by a group of quarter window filters (24 quarter window filters in total) linearly distributed on a Mel frequency standard. The scope covered by each quarter window filter is approximate to a critical bandwidth of a human's ear, thereby simulating the shelter effect of the human's ear. Wherein, the Mel frequency standard $$m = 2596\log_{10}\left(1 + \frac{f}{700}\right),$$

the center frequency of the quarter filter is f(y), y=1, 2, . . . , 24, and the frequency response definition of the quarter filter is as below:

$$H_y(k) = \begin{cases} 0, & k < f(y-1) \\ \dfrac{2(k-f(y-1))}{(f(y+1)-f(y-1))(f(y)-f(m-1))}, & f(y-1) \le k \le f(y) \\ \dfrac{2(f(y+1)-k)}{(f(y+1)-f(y-1))(f(y+1)-f(y))}, & f(y) \le k \le f(y+1) \\ 0, & k \ge f(y+1) \end{cases}$$

$$\text{wherein } \sum_{y=0}^{23} H_y(k) = 1$$

In step 2.4, the logarithm is taken from each power spectrum through the filter, by which a result S(y) approximate to homomorphism conversion can be obtained.

$$S(y) = \ln\left(\sum_{k=0}^{23} |X_a(k)|^2 H_y(k)\right), 0 \le y \le 24$$

wherein, $X_a(k)$ is the power spectrum of the audio signal, and $H_y(k)$ is the filter group.

In step 2.5, a final feature vector C(n) is obtained respectively through the discrete cosine transform.

$$C(n) = \sum_{y=0}^{23} S(y)\cos\left(\dfrac{\pi n(y-0.5)}{24}\right), 0 \le n \le 24$$

wherein, n represents the number of dimensions of the obtained feature vector, the feature vector is set to be 13-dimensional, and then n is set to be 12.

In step 2.6, the obtained 13-dimensional feature vector is stored in the memory, and after the feature vector of each frame in this segment of sound sample finishes the calculation, an arithmetic mean is calculated to obtain the feature vector of this segment of audio sample.

Step 3, Scene Recognition Process

Figure 7:
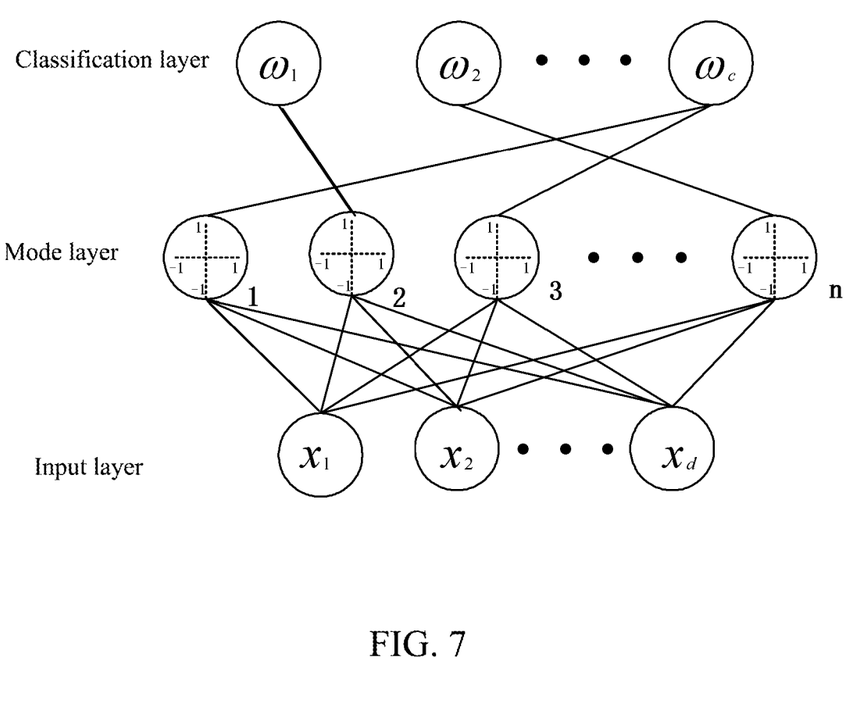
FIG. 7 illustrates a structure diagram of a scene classification recognition model according to an embodiment.

After the feature vector is extracted, this group of 13-dimensional feature vectors, as parameters, is then transmitted to the classification recognition algorithm. A probability neural network structure is adopted (as shown in FIG. 7), wherein, there are d input layer units, n mode layer units and c classification layer units. Each mode layer unit is able to make the inner product of normalized sample connection x and its weight vector, to obtain $z=w^t x$ and then map it to $\exp[(z-1)/\sigma^2]$.

The recognition classification algorithm has two parts, i.e., the training part and the recognition part.

Training Part

In step 3.1, the normalized sample x which is participated the training is a unit length, i.e., $$\sum_{i=1}^{d} x_i^2 = 1,$$

and the first normalized sample is placed on the input layer unit.

In step 3.2, those connections connecting the input units and the first mode layer unit are initialized as $w_1=x_1$. Then, a connection is established from the first mode layer unit to the unit representing the classification to which the $x_1$ belongs in the classification layer. The same process is repeated for each of the remaining mode units, i.e., $w_k=x_k$, wherein k=1, 2, 3, L, n.

In step 3.3, after step 3.2 is finished, a particular network can be obtained, i.e., the input layer units and the mode layer units are completely connected, and the mode layer units to the classification layer units are coefficient-connected. The $k^{th}$ component of the $j^{th}$ sample is recorded as $x_{jk}$, the connection weight coefficient from this component to the $j^{th}$ mode layer unit is recorded as $w_{jk}$, wherein j=1, 2, L, n, k=1, 2, L, d.

The matrix w appearing in this algorithm is the intermediate matrix which will be used in the recognition part of the algorithm.

The recognition part of the algorithm performs the calculation mainly concentrating on two elements, the first one is so-called net activation $net_k=w^t x$, which is used to construct a non-linear function $e^{(net_k-1)\sigma^2}$ about $net_k$, wherein, σ is a self-defined parameter and is set to be 10 in this algorithm. The second one is a judging function $g_i(x)$ calculated using $e^{(net_k-1)\sigma^2}$, and the scene of the sound feature information input into the neural network by calculating $$\max_i g_i(x)$$

at the end of the algorithm.

The present document implements locating based on background sound information as the feature of the scene, so that the mobile terminal quickly and correctly recognizes the current scene under the maintaining low-consumption state. The scene locating of the present document can be complementary to the antenna position locating, to improve their accuracies and improve the performance of the mobile terminal.

It should be noted that the embodiments and features in the embodiments in the present document can be arbitrarily combined with each other without conflict.

Of course, the present document may have many other embodiments, and a person having ordinary skill in the art can make various corresponding modifications and transformations according to the present document without departing from the spirit and essence of the present document. However, these corresponding modifications and transformations shall all fall into the protection scope of the appending claims of the present document.

A person having ordinary skill in the art can understand that all of or part of the steps of the above method may be implemented by instructing related hardware with a program which may be stored in a computer-readable medium, such as a read-only memory, a magnetic disk or an optical disk. Optionally, all of or part of the steps of the above embodiments may also be implemented by using one or more integrated circuits. Correspondingly, each module/unit in the above embodiments may be implemented in the form of hardware, or in the form of software functional modules. The present document is not limited to any particular form of combination of hardware and software.

INDUSTRIAL APPLICABILITY

The present document implements locating based on background sound information as the feature of the scene, so that the mobile terminal quickly and correctly recognizes the current scene under the maintaining low-consumption state.

The scene locating of the present document can be complementary to the antenna position locating, to improve the performance of the mobile terminal.

What is claimed is:

1. A system for mobile terminal locating according to antenna position locating and scene locating based on background sound information, comprising:
a mobile terminal and a scene recognition device, wherein the scene recognition device comprises a sound collection module, a preprocessing module, a feature extraction module, a scene recognition module, and a database; wherein,
the sound collection module is configured to collect a background sound signal and transmit the background sound signal to the preprocessing module;
the preprocessing module is configured to convert the background sound signal in time domain into a frequency domain signal and transmit the frequency domain signal to the feature extraction module;
the feature extraction module is configured to: calculate an arithmetic square for spectrum amplitude of the frequency domain signal to obtain power spectrum of the frequency domain signal, filter the power spectrum of the frequency domain signal, calculate a logarithm for the filtered power spectrum of the frequency domain signal to obtain a result approximate to homomorphism conversion, and finally extract a sound feature vector through a discrete cosine transform;
the database is configured to store intermediate matrixes for different scenes which are obtained by using a neural network which includes d input layer units, n mode layer units and c classification layer units, wherein the intermediate matrixes are obtained by:
normalizing samples x which are participated training to a unit length, $$\sum_{i=1}^{d} x_i^2 = 1,$$

and placing the normalized samples on the input layer units;
initializing connections connecting the input units and the mode layer units as $w_k = x_k$, wherein k=1, 2, 3, ..., n; and establishing connections from the mode layer units to the corresponding classification layer units representing the classification to which the $x_k$ belongs, to form the neural network in which the input layer units and the mode layer units are completely connected and the mode layer units to the classification layer units are coefficient-connected;
obtaining connection weight coefficients $w_{jk}$ which represent a component $x_{jk}$ connecting to the $j^{th}$ mode layer unit, wherein, $x_{jk}$ is the $k^{th}$ component of the $j^{th}$ sample, j=1, 2, ..., n, k=1, 2, ..., d, then obtaining a matrix W as the intermediate matrix;
the scene recognition module is configured to input the sound feature vector under the neural network, obtain a recognition result by calculating using the intermediate matrixes and the sound feature vector, and determine a scene corresponding to the sound feature vector;
the mobile terminal is configured to perform the scene locating according to the determined scene to be complementary to the antenna position locating, to improve locating accuracy and improve performance of the mobile terminal.

2. The system according to claim 1, wherein, the scenes refer to space scenes in different sound environments.

3. The system according to claim 1, wherein, the sound collection module, the preprocessing module, the feature extraction module, the scene recognition module, and the database are all located in the mobile terminal.

4. The system according to claim 1, wherein, the sound collection module, the preprocessing module, the feature extraction module, and the scene recognition module are all located in the mobile terminal, and the database is located in a service-side device.

5. The system according to claim 1, wherein, the sound collection module, the preprocessing module, and the feature extraction module are all located in the mobile terminal, the scene recognition module and the database are located in a service-side device;
the mobile terminal further comprises a scene recognition control module, which is configured to receive the sound feature vector and transmit the sound feature vector to the service-side device, and is further configured to receive a recognition result output by the scene recognition module.

6. A method for mobile terminal locating according to antenna position locating and scene locating based on background sound information, comprising:
collecting a background sound signal;
converting the background sound signal in time domain into a frequency domain signal;
calculating an arithmetic square for spectrum amplitude of the frequency domain signal to obtain power spectrum of the frequency domain signal, filtering the power spectrum of the frequency domain signal, calculating a logarithm for the filtered power spectrum of the frequency domain signal to obtain a result approximate to homomorphism conversion, and finally extracting a sound feature vector through a discrete cosine transform;
inputting the sound feature vector under a neural network, obtaining a recognition result by calculating using intermediate matrixes obtained by using the neural network and the sound feature vector, and determining a scene corresponding to the sound feature vector;
locating a mobile terminal by performing the scene locating according to the determined scene and the antenna position locating, to be complementary to the antenna position locating, to improve locating accuracy and improve performance of the mobile terminal;
wherein, the neural network includes d input layer units, n mode layer units and c classification layer units, and the step of obtaining the intermediate matrixes comprises:
normalizing samples x which are participated training to a unit length, $$\sum_{i=1}^{d} x_i^2 = 1,$$

and placing the normalized samples on the input layer units;

initializing connections connecting the input units and the mode layer units as $w_k=x_k$, wherein k=1, 2, 3, . . . , n; and establishing connections from the mode layer units to the corresponding classification layer units representing the classification to which the $x_k$ belongs, to form the neural network in which the input layer units and the mode layer units are completely connected and the mode layer units to the classification layer units are coefficient-connected;

obtaining connection weight coefficients $w_{jk}$ which represent a component $x_{jk}$ connecting to the $j^{th}$ mode layer unit, wherein, $x_{jk}$ is the $k^{th}$ component of the $j^{th}$ sample, j=1, 2, . . . , n, k=1, 2, . . . , d, then obtaining a matrix W as the intermediate matrix.

7. The method according to claim 6, wherein,
the scenes refer to space scenes in different sound environments.

8. A mobile terminal, comprising: a sound collection module, a preprocessing module, a feature extraction module, and a processing module; wherein,
the sound collection module is configured to collect a background sound signal and transmit the background sound signal to the preprocessing module;
the preprocessing module is configured to convert the background sound signal in time domain into a frequency domain signal and transmit the frequency domain signal to the feature extraction module;
the feature extraction module is configured to calculate an arithmetic square for spectrum amplitude of the frequency domain signal to obtain power spectrum of the frequency domain signal, filter the power spectrum of the frequency domain signal, calculate a logarithm for the filtered power spectrum of the frequency domain signal to obtain a result approximate to homomorphism conversion, and finally extract a sound feature vector through a discrete cosine transform; and
the processing module is configured to receive the sound feature vector and obtain a scene corresponding to the sound feature vector and locate the mobile terminal by performing the scene locating according to the determined scene and the antenna position locating, to be complementary to the antenna position locating, to improve locating accuracy and improve performance of the mobile terminal;
wherein the processing module comprises a scene recognition module and a database; wherein,
the database is configured to store intermediate matrixes for different scenes which are obtained by using a neural network which includes d input layer units, n mode layer units and c classification layer units, wherein the intermediate matrixes are obtained by:
normalizing samples x which are participated training to a unit length, $$\sum_{i=1}^{d} x_i^2 = 1,$$

and placing the normalized samples on the input layer units;
initializing connections connecting the input units and the mode layer units as $w_k=x_k$, wherein k=1, 2, 3, . . . , n; and establishing connections from the mode layer units to the corresponding classification layer units representing the classification to which the $x_k$ belongs, to form the neural network in which the input layer units and the mode layer units are completely connected and the mode layer units to the classification layer units are coefficient-connected;
obtaining connection weight coefficients $w_{jk}$ which represent a component $x_{jk}$ connecting to the $j^{th}$ mode layer unit, wherein, $x_{jk}$ is the $k^{th}$ component of the $j^{th}$ sample, j=1, 2, . . . , n, k=1, 2, . . . , d, then obtaining a matrix W as the intermediate matrix; and
the scene recognition module is configured to receive the sound feature vector, input the sound feature vector under the neural network, obtain a recognition result by calculating using the intermediate matrixes and the sound feature vector, and determine a scene corresponding to the sound feature vector.

* * * * *